United States Patent

[11] 3,589,188

| [72] | Inventor | Pierre Belle<br>Grenoble, Isere, France |
|---|---|---|
| [21] | Appl. No. | 749,015 |
| [22] | Filed | July 31, 1968 |
| [45] | Patented | June 29, 1971 |
| [73] | Assignees | Satam-Societe Anonyme pour Tous<br>Appareillages Mecaniques<br>Seine-St. Denis, France;<br>Sogreah-Societe Grenobloise d'Etudes et<br>d'Applications Hydrauliques<br>Grenoble, France |
| [32] | Priority | Aug. 2, 1967 |
| [33] | | France |
| [31] | | 116,591 |

[54] TURBINE-TYPE FLOW METER
9 Claims, 3 Drawing Figs.

[52] U.S. Cl. .................................................. 73/230
[51] Int. Cl. ................................................ G01f 1/12
[50] Field of Search ........................................... 73/230,
231, 228, 203

[56] References Cited
UNITED STATES PATENTS

| 3,000,210 | 9/1961 | Favre-Herman | 73/231 |
| 3,024,656 | 3/1962 | Favre-Herman | 73/230 |
| 3,370,465 | 2/1968 | Belle | 73/230 |

*Primary Examiner*—Richard C. Queisser
*Assistant Examiner*—John K. Lunsford
*Attorney*—Pennie, Edmonds, Morton, Taylor and Adams

ABSTRACT: There is disclosed an axial flow turbine-type flow meter in which a rotor having helical blades is supported to rotate on a shaft disposed axially of a conduit having a cross section graduated along the length thereof. This shaft in turn is supported from the walls of the conduit on elastic flexible members which yield under the stress of a flow of fluid through the conduit so that the rotor shifts axially of the conduit through small distances in accordance with the rate of flow of fluid. In order to vary the amount of this shift produced by given rates of flow, means are provided to vary the effective length of at least one of these flexible members.

INVENTOR
Pierre Belle

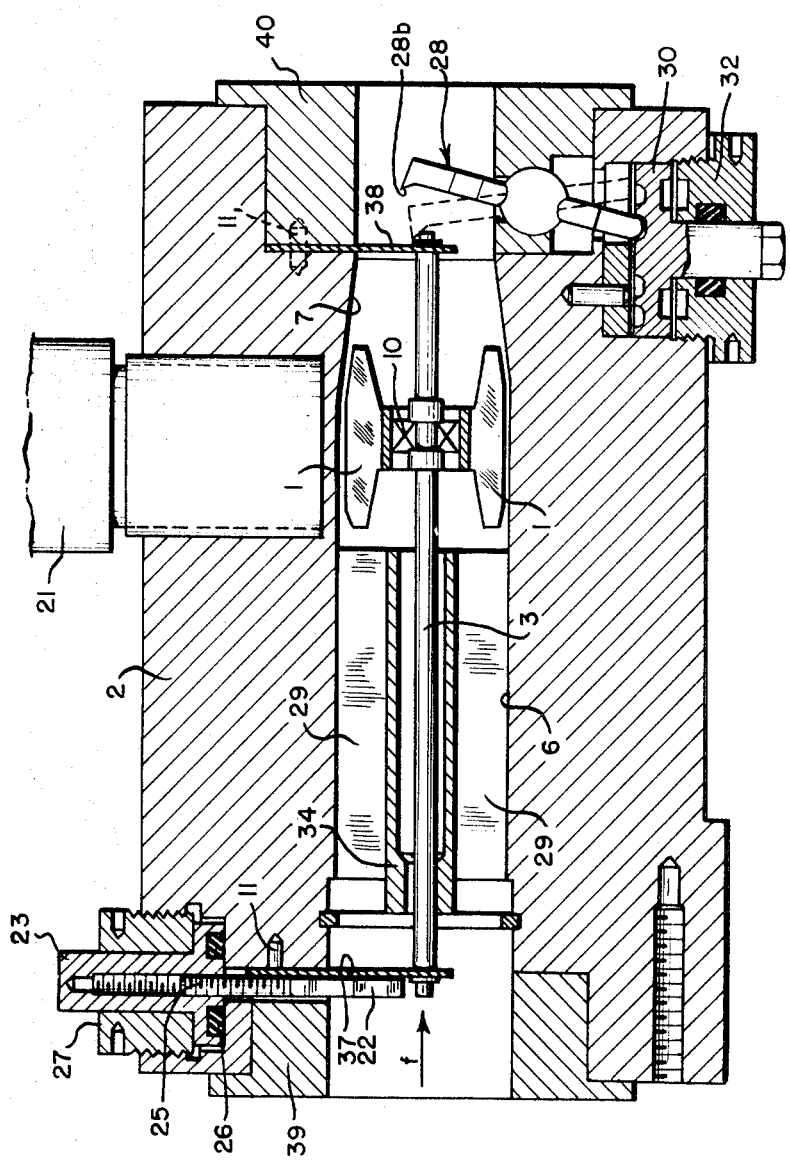

TURBINE-TYPE FLOW METER

U.S. Pat. No. 3,370,465 discloses and claims a turbine-type flow meter in which a rotor having helical blades is supported to rotate on a stationary shaft disposed axially of a conduit having a cross section graduated along the length thereof—a conical conduit in particular. Abutments on the shaft define limiting upstream and downstream positions for the rotor between which it can move axially of the conduit on the shaft, the rotor being at least partly within the conical portion of the conduit in at least one of these limiting positions. A helical spring engaged about the shaft between the rotor and the downstream abutment stresses the rotor against its upstream abutment. As a result, for flow rates above a threshold value at which the fluid exerts on the rotor an axial downstream force equal to that exerted on it by the spring, the rotor moves axially downstream to positions of altered clearance between the rotor and conduit and hence of altered relation between the volume of fluid passing through the conduit in unit time and the number of rotations made by the rotor in unit time. The variation with axial rotor position of the ratio of rotor turns to unit volume of flow can then be used to compensate for the variation with rate of flow which characterizes that ratio at any given axial rotor position.

The present invention provides an improved form of axial flow turbine-type flow meter wherein mechanical friction on the rotor during axial displacement thereof is minimized and in which moreover the relation between axial stress on the rotor from the flowing fluid and resulting axial displacement of the rotor can be changed during operation and from outside the meter as a function of the ratio of rotor turns to unit volume of flow desired.

In the meter of the present invention the rotor is mounted on a shaft which in turn is supported by blades or stems having elastic flexibility in directions parallel to the axis of rotation of the rotor, these blades being embedded in or otherwise fastened over one part of their length to the walls of the conduit or otherwise to the flow meter housing. The rotor and shaft combination can therefore undergo axial displacement under the influence of the flowing fluid acting on the rotor and on these blades. Means are additionally provided to change from the exterior of the meter the length over which at least one of these blades is effectively fastened to the meter housing and thereby the free length thereof, or the length thereof exposed to the current of fluid flowing through the meter. Thus deflectors may be disposed upstream of one or more of the elastic blades, covering more or less of the free length of the blades according to the extent of the protrusion of those deflectors into the flow conduit, so as to shield such blade or blades to a greater or lesser extent from the effect of the flowing fluid. Means may be provided to alter the extent of this protrusion from outside the flow meter, and therefore in this way also to modify the relation between rotor turns and unit volume of flow.

BRIEF DESCRIPTION OF THE DRAWINGS

The invention will now be further described in terms of a number of presently preferred embodiments thereof and with reference to the accompanying drawings in which:

FIG. 3 is an axial section through a modified form of flow meter according to the invention. Referring first to FIGS. 1 and 2, the flow meter of the invention comprises a rotor 1 which rotates in an opening 6 in a generally tubular housing or conduit 2. The opening includes a cylindrical portion and also a conical portion indicated at 7, the fluid of which the flow is to be measured passing through the meter from left to right in FIGS. 1 and 3 as indicated by the arrow $f$. The rotor is provided with helical or, more properly stated, helicoidal blades or vanes, and is mounted to rotate freely on the shaft 3 by means of ball bearings 10, the inner race of which is fixed to the shaft 3 so that the rotor can turn with reference to the shaft but without moving axially with respect thereto.

Figure 1:
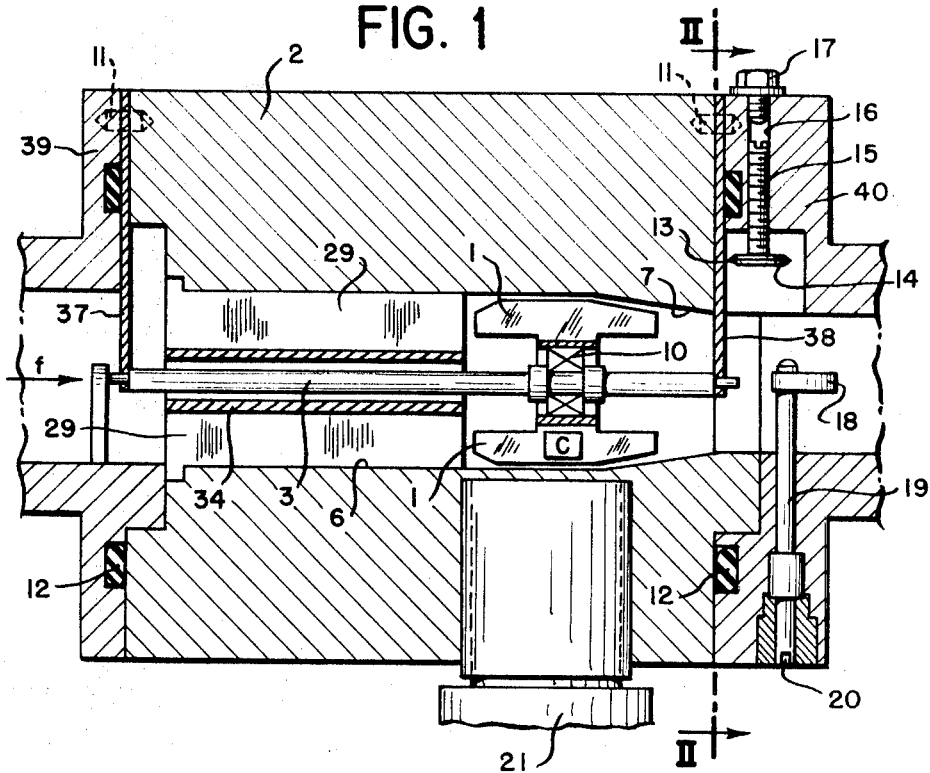
FIG. 1 is an axial section taken on the line I–I of FIG. 2 illustrating a flow meter according to the invention.
Figure 2:
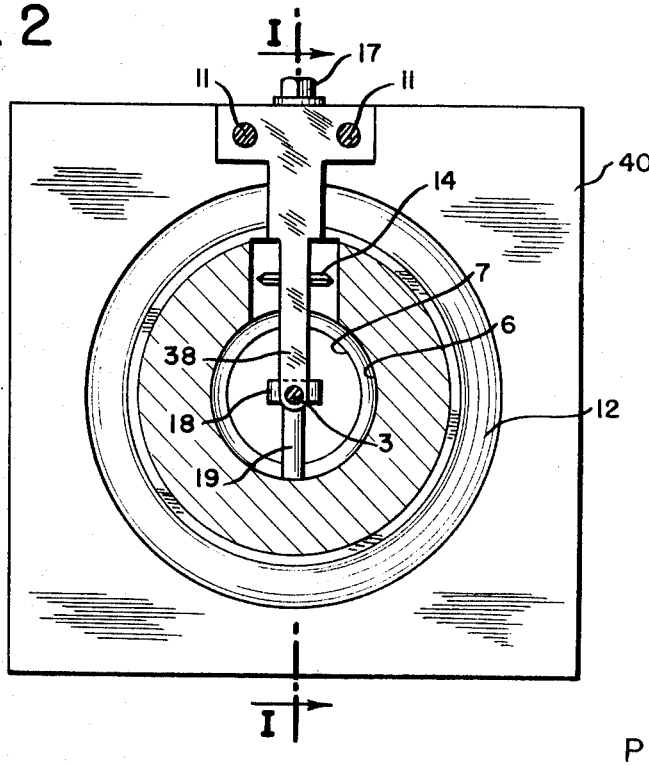
FIG. 2 is a transverse section taken on the line II–II of FIG. 1.

A pickup unit 21 makes it possible to count and record the number of revolutions executed by the rotor, one of whose vanes may include a ferromagnetic sector C.

The shaft 3 is supported in the opening 6 by means of two elastic flexible bladelike supports 37 and 38, each of which may take the form of a thin metallic blade having elastic flexibility in the direction of flow of fluid through the meter. These blades are respectively fastened between the conduit 2 and end pieces 39 at the left and 40 at the right of the meter conduit section 2, these end pieces serving for connection between the meter and the upstream and downstream conduits carrying the fluid whose flow is to be measured. The blades 37 and 38 are centered by means of pin 11, and fluid-tight seals 12 are provided between the housing 2 and the end pieces 39 and 40.

Support of the rotor 1 and its shaft 3 in the opening of the housing by means of the flexible members 37 and 38 makes it possible for the rotor 1 and its shaft 3 to move downstream without friction in response to the force of the fluid flowing through the meter, acting on the rotor and also on these flexible members.

The movable combination of the shaft and rotor is mounted with a slight eccentricity in the opening 6 such that the rotor will be properly centered when the meter is traversed by fluid at a flow rate above a specified minimum. This eccentric mounting does not perturb the measurement since it may be of the order of three-tenths of a millimeter whereas the usual clearance between the walls of the passage 6 and the rotor is of the order of 1 millimeter.

The relation between the rate of flow and the axial displacement of the rotor may be changed from outside the meter by changing the point 13 (FIG. 1) at which the end plate 40 bears against the flexible land 38, thereby changing the free length of that blade. The bearing point 13 is defined by a disc 14 fastened to a screw 15.

The disc 14 which determines the free length of the blade 38 can be shifted along the blade 38 by rotating the screw 15 by means of a screwdriver inserted into the tapped hole 16 after removing the sealing plug 17.

A limit or stop for the axial motion of the shaft 3, adjustable from outside the meter, is provided by a cam 18 mounted on a shaft 19. The angular position of the cam can be controlled by means of a screwdriver operating on the slot 20.

Between the blade 37 and rotor there may be provided a plurality of radial fins 29, extending radially between the inner walls of the conduit 2 and a tube 34 surrounding shaft 3, in order to stabilize or regularize the streaming pattern of the fluid whose flow is to be measured.

FIG. 3 illustrates a modified form of construction in which the axial motion of the rotor in response to changing rates of flow can be changed from outside the meter by means of a shield or deflector 22 disposed upstream of the support 37 so that the influence of stream flow on the support 37 is suppressed over a part of its length. Adjustment is made from the exterior of the meter by rotating a nut 23 which provokes radial motion of the threaded rod 25 carrying the deflector 22 at the inner end thereof. Seals 26 are provided and also a lock nut 27 to hold the rod 25 in a selected position.

In the embodiment of FIG. 3 the shaft 3 is provided with an end stop in the form of a generally radially extending rod or lever 28 which passes through a ball joint in ring 40 and whose outer end is engaged in a groove of spiral shape in a plate 30. The position of the stop can then be adjusted from outside the meter by rotating the plate 30, which may however be fixed in position by means of a nut 32.

When the shaft 3 bears against the stop 28, the pressure of the fluid acting on the blades 37 and 38 tends to deform them, provoking lateral motion of the shaft. To prevent such lateral motion of the shaft the inner end of the stop rod 28 is provided with a hook as indicated at 28b.

The clearance between the inner wall of the tube 34 and the shaft 3 is such that when the shaft 3 is at the end of its axial motion, its upstream end is on the point of engaging the inner face of the tube. This limits lateral motion of the upstream end of the shaft within narrow limits such that the lateral motion of the rotor itself is negligible in view of its separation from the upstream end of the shaft.

The flexible supports 37 and 38 are disposed upstream of the guide blades 29 and downstream of the rotor 1 respectively so as not to perturb the flow of fluid which acts on the rotor.

While the invention has been described hereinabove in terms of a number of presently preferred embodiments thereof, the invention itself is not limited thereto. Thus for example, the rotor may be fixed to a shaft which rotates therewith, this shaft having bearings in the blades 37 and 38. Moreover, there may be employed in the flow meter of the present invention a helical spring much as in U.S. Pat. No. 3,370,465, engaged between the rotor and a stop, to define together with the elastic support means such as blades 37 and 38 and the adjustable disc 14, deflector 22 or the like the relation between rate of flow and axial position of the rotor. More generally, the present invention includes all modifications of and departures from the embodiments hereinabove described properly falling within the spirit and scope of the appended claims.

I claim:

1. A turbine-type flow meter comprising a conduit having a portion of graduated cross section, a rotor having vanes, flexible rotor support means affixed at one portion thereof to said conduit, said rotor being supported on said support means, and means to alter the length of said support means exposed to flexure under influence of a fluid flowing through said conduit.

2. A flow meter according to claim 1 wherein said last-named means comprise means to alter the location along said support means at which it is affixed to said conduit.

3. A flow meter according to claim 2 wherein said altering means comprise a screw-mounted disc engageable with said support means.

4. A flow meter according to claim 1 wherein said last-named means comprise means to shield a portion of said flexible support means from the streaming action of said fluid.

5. A flow meter according to claim 4 wherein said shielding means are supported on a threaded rod engaged in a nut rotatable with respect to said conduit.

6. A flow meter according to claim 1 further comprising a stop interposable in the path of said rotor, and means to adjust the position of said stop from outside the conduit.

7. A flow meter according to claim 6 wherein said stop comprises a cam, and a shaft supporting said cam and extending substantially radially of said conduit and rotatable with respect thereto.

8. A flow meter according to claim 6 wherein said stop comprises a lever, means fixed with respect to said conduit defining a pivot for said lever at a location between the ends thereof, and a plate rotatable with respect to said conduit, said plate having a groove therein engaged by the radially outer end of said lever.

9. A flow meter according to claim 8 wherein said lever is provided with a hook on the radially inner end thereof to restrain the rotor against motion laterally of said conduit.